United States Patent [19]

Maurice et al.

[11] 4,388,333

[45] Jun. 14, 1983

[54] SIMULATED ADIPOSE TISSUE

[75] Inventors: Terrence J. Maurice, Colborne; Edward D. Murray, Winnipeg; Jennifer M. Agnes, Cobourg, all of Canada

[73] Assignee: General Foods Inc., Don Mills, Canada

[21] Appl. No.: 88,493

[22] Filed: Oct. 26, 1979

[30] Foreign Application Priority Data

Oct. 10, 1978 [CA] Canada .................................. 313038

[51] Int. Cl.³ ........................ A23D 5/00; A23D 5/02; A23J 3/00
[52] U.S. Cl. .................................... 426/104; 426/574; 426/576; 426/613; 426/652; 426/656; 426/657; 426/802; 426/602
[58] Field of Search ............... 426/104, 656, 802, 652, 426/574, 576, 602, 613, 657

[56] References Cited

U.S. PATENT DOCUMENTS

| 3,840,677 | 10/1974 | Leidy et al. | 426/104 X |
| 4,001,441 | 1/1977 | Liepa | 426/802 X |
| 4,132,810 | 1/1979 | Knutson | 426/104 |
| 4,143,164 | 3/1979 | Shanbhag et al. | 426/104 |
| 4,169,090 | 9/1979 | Murray et al. | 426/656 X |
| 4,208,323 | 6/1980 | Murray et al. | 426/656 X |
| 4,250,198 | 2/1981 | Millar et al. | 426/656 |

FOREIGN PATENT DOCUMENTS

| 1028552 | 3/1978 | Canada | 426/656 |
| 47-20377 | 6/1972 | Japan | 426/602 |

Primary Examiner—Esther M. Kepplinger
Attorney, Agent, or Firm—Sim & McBurney

[57] ABSTRACT

Simulated adipose tissue is provided by heat coagulation of an aqueous emulsion of lipid material having protein fibres dispersed therein, formed using at least one emulsifying protein isolate, egg white and gelatin in defined proportions as the emulsifying and coagulating agents. The heat coagulated material has good oil release on cooking and in the mouth and may be flavored for any desired end use. A bacon analog utilizing the simulated adipose tissue as the white (fat) phase thereof is described.

15 Claims, No Drawings

SIMULATED ADIPOSE TISSUE

DESCRIPTION

1. Technical Field

The present invention relates to simulated adipose tissue.

2. Background Art

Adipose tissue (animal fat) is naturally present in a variety of meat products such as, bacon, steak, chops and roasts. Adipose tissue is also used in a variety of processed meat products, such as, breakfast sausage and meat snacks. The adipose tissue imparts a number of beneficial and highly acceptable properties, such as oil release on cooking and in the mouth. However, the ever diminishing lands available for grazing and growing feed for animals has intensified the search for satisfactory simulated meat products having comparable properties to the natural animal product.

DISCLOSURE OF INVENTION

The present invention relates to a simulated adipose tissue which is based on heat coagulable proteinaceous emulsifiers, fibrous proteins and edible lipid material, preferably of non-animal source. The product of this invention has the appearance and properties of adipose tissue and may be used in a variety of food products.

The oil release characteristics of the product are determined by the "fry-away", i.e., the weight loss on frying, which results on frying of slices of the product. The fry-away generally is in the range of about 25 to about 70% by weight.

The non-meat proteinaceous emulsifiers and coagulants used in this invention are constituted by a mixture of precisely limited relative proportions of egg white, gelatin and at least one emulsifying protein isolate.

The proportions of the components which may be used in the simulated adipose material provided in accordance with this invention may vary over a wide range, depending on the desired end properties of the products. The general and preferred ranges are set forth in the following Table I:

TABLE I

| Component | % by weight General Range | Specific Range |
|---|---|---|
| Lipid material | about 65 to about 80 | about 70 to about 75 |
| Water | about 15 to about 25 | about 18 to about 23 |
| Proteinaceous emulsifiers-overall | about 2.5 to about 7.0 | about 3.0 to about 5.0 |
| Protein isolate (dry) | about 1 to about 4 | about 1.5 to about 2.5 |
| egg white | about 1 to about 2.5 | about 1 to about 1.75 |
| gelatin | about 0.1 to about 1.0 | about 0.3 to about 0.5 |
| Protein fibres | about 15 to about 45 | about 15 to about 20 |

The emulsifying protein isolate may be any convenient protein isolate having fat emulsifying properties. It has been found that different protein isolates produce different oil release and texture characteristics, and mixtures of such materials may be used to provide the desired combination of properties. Suitable protein isolates include soy protein isolate and a protein micellar mass (known hereinafter as "PMM").

PMM is a unique protein isolate, the formation of which is described in our Canadian Pat. No. 1,028,552 and involves a controlled two-step operation, in which, in the first step, the protein source material is treated with an aqueous food grade salt solution at a temperature of about 15° to about 35° C., a salt concentration of at least 0.2 ionic strength, generally about 0.2 to about 0.8, and a pH of about 5.5 to about 6.5 to cause solubilization (or salting-in) of the protein, usually in about 10 to about 60 minutes, and, in the second step, the aqueous protein solution is diluted to decrease its ionic strength to a value less than about 0.1.

The dilution of the aqueous protein solution, which may have a protein concentration, for example, up to about 10% w/v, causes association of the protein molecules to form highly proteinaceous micelles which settle in the form of an amorphous highly viscous, sticky, gluten-like micellar mass of protein. The protein micellar mass so produced is referred to herein as PMM and is used to form the protein fibers. The web PMM may be dried to a powder and the drying may be effected in any convenient manner, such as, spray drying, freeze drying or vacuum drum drying.

Improvements in the procedure described in Canadian Pat. No. 1,028,552 may be made to increase the yield of the unique protein isolate from the aqueus protein solution.

The protein materials from which the wet PMM is formed may vary widely and include plant proteins, for example, starchy materials, such as, wheat, corn, oats, rye, barley and triticale; starchy legumes, such as, field peas, chickpeas, fababeans, navy beans and pinto beans; and oil seeds, such as, sunflower seeds, peanuts, rapeseed and soybeans; animal proteins, such as, serum proteins; and microbial protein, i.e., single cell proteins. Preferably, the protein source is a plant material owing to the readily-available nature of these materials.

The mild processing operations effected on the source protein to form the PMM ensure that the protein isolate is in a substantially undenatured form, as determined by differential scanning calorimetry.

Apart from the protein isolate, the remainder of the emulsifier mix is provided by egg white and gelatin. It has been found that all three components are necessary to provide a product having good dimensional stability, good sliceability and good oil release during cooking.

Thus, if gelatin is omitted entirely, the product is soft and non-sliceable whereas if the overall gelatin concentration is too high, then a hard, low oil release product is obtained. Gelatin alone does not produce emulsification.

Similarly, combinations of protein isolate and gelatin alone form products which are soft and lacking in sliceability while egg white and gelatin alone produce a rubbery mass with no fat-like quality and no oil release. All three components, therefore, are required.

The weight ratio of these various proteins at the same overall protein level may be varied considerably to control the final texture from soft to hard. The greater the proportion of egg white present, the drier is the product with less oil release while the greater the proportion of protein isolate present, the more fat-like the product becomes with greater oil release.

The fibrous protein used in the product of this invention may be any conventional texturizing fibrous protein, but preferably is the protein fibres formed from PMM by injection of a PMM into hot water. The fibrous protein provides a structure closely resembling adipose tissue and adds texture, mouth feel and strength to the product.

In addition, the protein fibres increase the overall protein content of the product while the fibres do not significantly decrease oil release on cooking although some decrease in oil release is experienced with increasing concentrations of fibres. The fibres, therefore, represent a substantially inert protein filler with respect to fat binding. The presence of the protein fibres thus enables the overall protein level of the product after oil release on cooking to increase to a high level, for example, about 15 to about 30 wt.%, without resulting in a cake-like texture and without having to use high cost protein materials.

Protein fibres of various dimensions may be employed in the product of the invention, generally of length of about 0.5 to about 15 cm, preferably about 1 to about 4 cm, and of diameter of about 0.1 to about 1 mm. Mixtures of fibres of differing dimensions may be used to provide variable texture.

The edible lipid material may be any convenient edible lipid material capable of emulsification in water with the mixture of emulsifiers and is usually at least one edible oil, preferably from a non-animal source, such as a vegetable oil, which may be unsaturated.

The simulated adipose tissue is formed by dissolving and/or dispersing the proteinaceous emulsifiers in water, emulsifying the edible lipid material with the proteinaceous dispersion, incorporating the fibrous protein in the emulsion in dispersed form, and then heat setting the emulsion to a fat-like solid material consisting of a heat-coagulated matrix of protein with entrapped lipid material having protein fibres dispersed therethrough.

The fibrous protein may be incorporated into the emulsion in any convenient manner, such as by direct addition thereto or by dispersing the same in the aqueous emulsifier dispersion. It is usually preferred to add the fibres to the emulsion to avoid degradation under the usually high shear conditions of emulsion formation.

The degree of emulsification achieved and hence the final texture of the product can be controlled to a certain degree by variation of certain parameters during the emulsification step.

For example, the pH of the emulsifier dispersion can affect the emulsification capacity of the proteins. The aqueous dispersion, therefore, is usually adjusted, if necessary, to a pH of about 6.5 to about 8.0, preferably about 7.0 to about 7.6, prior to commencing emulsification.

Variations in the temperature at which emulsification occurs also varies the degree of emulsification, with greater emulsification occurring at 40° C. than at ambient temperature (20° to 25° C.). This difference in emulsification leads to a higher oil release from a product produced at a higher emulsification temperature.

The presence or absence of sodium chloride also has an effect on emulsification. Since sodium chloride tends to increase dispersion of the proteins and the more dispersed the proteins, the more available they are for emulsification, it is preferred to provide small amounts, generally up to about 3.5% by weight, preferably about 1 to about 2.5% by weight.

The emulsification is usually effected under conditions of high shear for at least part of the procedure, although high shear can lead to over emulsification and destabilization if prolonged. Usually, a high shear mixing of about 5 to 15 minutes is adopted with a final low shear mixing being effected for about 5 to 15 minutes.

Depending on the desired end use of the simulated adipose tissue, flavourings of any type may be incorporated into the product by inclusion of the same in the emulsion prior to heat setting.

The emulsion is heat set by heating to an elevated coagulating temperature, generally in the range of about 90° to about 120° C. with a superatmospheric pressure being applied, if necessary, at the upper end of this range. It has been found that the texture of the product varies with the coagulating temperature, with a firmer product being obtained at the higher temperatures.

The simulated adipose material provided in accordance with this invention has the appearance and feel of adipose tissue and exhibits fat release on cooking so that no additional oil is required. The product also exhibits fat release in the mouth which together with the fibrous texture give a good mouthfeel to products incorporating the simulated adipose material.

The simulated adipose tissue of this invention may be used in a variety of products as a simulated meat fat material, such as in chunk form in various food products, such as meat snacks and dried sausages, or as the white phase of a bacon analog material.

In U.S. Pat. No. 3,840,677, assigned to General Foods Corporation, there is described a bacon analog product comprising a fatty or white phase and a lean or red phase. A new bacon analog product is provided by a combination of the simulated adipose tissue of this invention as the white phase and a red phase having the composition set forth in the U.S. patent, as outlined in the following Table II:

TABLE II

| Component | % by weight | |
|---|---|---|
| | General Range | Preferred Range |
| Water | about 40 to about 65 | about 45 to about 60 |
| Fat | about 10 to about 25 | about 15 to about 25 |
| Protein isolate | about 6 to about 24 | about 9 to about 18 |
| Albumen | up to about 15 | about 1 to about 8 |
| Proteinaceous filler | 0 to about 15 | about 1 to about 10 |
| Colour and flavouring agents | to taste (usually 5 to 15) | about 5 to about 10 |
| Thickening agent | 0 to about 2 | 0 to about 1 |

As described in the prior patent, a bacon analog product is obtained by layering emulsions corresponding to the red phase and white phase in the desired thickness and then heat coagulating the layered emulsions. The resulting coagulated material has good sliceability and is sliced to the desired thickness.

The use of the simulated adipose material of this invention as the white phase results in a simulated bacon analog which crinkles and has good texture on cooking, and has good oil release for frying without added cooking oil or fat.

BEST MODE FOR CARRYING OUT THE INVENTION

The invention is illustrated by the following examples:

EXAMPLE I

This Example illustrates the formation of a simulated adipose tissue in accordance with this invention and the use thereof in a bacon analog.

A formulation for the simulated adipose tissue was chosen, as follows:

| Component | Wt. % |
|---|---|
| Fababean PMM | 2.50 |
| Egg white solids | 1.00 |
| Gelatin | 0.33 |
| Sodium chloride | 2.00 |
| Water | 21.50 |
| Vegetable oil | 72.67 |
| | 100.00% |
| Protein fibres | 30 wt. % of above |
| Spices and flavours | as required for taste |

The fababean PMM (i.e., a PMM prepared from fababeans in accordance with the process of Canadian Pat. No. 1,028,552) was dispersed with sodium chloride in 80% of the water, the pH was adjusted to about 7.6, and the mixture was solubilized for 30 minutes. The gelatin was dispersed in the remaining 20% of the water, heated to about 40° C. to solubilize the same and cooled to about 30° C. prior to addition to the fababean PMM dispersion. The egg white solids were then added to the protein mixture, the pH again adjusted to about 7.6, and the mixture was solubilized for about 15 minutes.

Rehydrated (in water) thawed fresh fababean PMM fibres of diameter about 0.4 mm and length of about 0.5 to about 2 cm were added to the solubilized mixture along with water soluble spices and flavours. Two-thirds of the oil was then blended (or homogenized) with the protein and fibre mixture at high shear for 10 minutes after first dissolving oil soluble flavours in the oil.

The mixture was transferred to a Hobart Kitchen Aid TM mixer, and the remaining oil was blended in at speed 8 to 10 minutes. The resulting emulsion was layered into pans with lean phase bacon analog as described in U.S. Pat. No. 3,840,677 and heat set for 1 hour in flowing steam. The heat-set slab then was tempered for 12 to 24 hours at about 4° C.

The tempered slab was sliced to desired thickness and fried at 177° C. (350° F.) for time varying from 4 to 8 minutes providing different final doneness and texture. No oil was added and satisfactory oil release was observed. The cooked bacon analog exhibited good taste characteristics, as compared with natural bacon.

EXAMPLE 2

In this Example, PMM materials from other protein sources, namely, pea PMM, peanut PMM and soybean PMM were substituted for the fababean PMM in the formulation and the procedure was repeated. Results equivalent to those obtained in Example I were obtained in each case.

EXAMPLE 3

In this Example, the PMM fibres were rehydrated in protein solution made up from PMM. The overall firmness of the white phase appeared to be increased.

EXAMPLE 4

This example illustrates the variation in texture of the bacon analog product with varying quantities and sizes of PMM fibres.

The procedure of Example 1 was repeated, except that the quantity of the fibres was varied over the range of 15 to 45% by weight of the remainder of the composition and fibres of diameter 0.4 mm and 0.1 mm were used in varying proportions of 40 to 70 wt.% of large diameter fibres to 60 to 30 wt.% of small diameter fibres.

The texture of the product varied from crunchy to chewy.

EXAMPLE 5

This Example illustrates the variations in properties of the bacon white phase in the bacon analog product formed following the procedure of Example 1.

The procedure of Example 1 was repeated except that the relative weight proportions of PMM and egg white were varied while the overall protein weight remained the same and the properties of the bacon white phase were observed. The following Table III summarizes the results obtained:

TABLE III

| wt. % | | | | Oil Release |
|---|---|---|---|---|
| Egg | PMM | Colour | Texture | on Cooking |
| 0 | 3.5 | Brownish | Soft, lacks stability, not sliceable | — |
| 0.875 | 2.625 | Off-white | Soft, sliceable but lacks cohesiveness | High oil release |
| 1.75 | 1.75 | Slight yellow | Fat-like, texture slightly rubbery | Good oil release |
| 2.625 | 0.875 | Yellowish | Dry, crumbly, rubbery texture | Little oil release |
| 3.5 | 0 | Yellow | Very rubbery, crumbles when fried | No oil release |

At overall weight proportions of 2.5 wt.% protein isolate, 1 wt.% egg white and 0.33 wt.% gelatin, varying proportions of a PMM and a soy protein isolate (Promine D TM) were used in the bacon white phase and the oil release properties determined. When 100% PMM was used, the fry-away value was 26 wt.% and increased with increasing proportions of soy protein to a value of 44 wt.% at 100% soy isolate. It was also observed that the cooked material became more crumbly as the proportion of soy isolate increased.

Industrial Applicability

In summary of this disclosure, the present invention provides a simulated adipose tissue having many desirable properties and wide utility. Modifications are possible within the scope of this invention.

We claim:

1. A process for the production of a simulated adipose tissue consisting essentially of a heat-coagulated matrix of protein with entrapped lipid material and having protein fibres dispersed therethrough, said process comprising:

dissolving and/or dispersing a mixture of proteinaceous emulsifying materials in water, said mixture of proteinaceous emulsifying materials comprising egg white, gelatin and at least one emulsifying protein micellar mass;

emulsifying an edible lipid material with the proteinaceous dispersion to provide a stable oil-in-water emulsion;

incorporating protein fibres in dispersed form in the emulsion; and heat coagulating said emulsion to a fat-like solid material, said lipid material, water, proteinaceous emulsifying materials and protein fibres being used in the following percentages by weight:

lipid material—about 65 to about 80
Water—about 15 to about 25
Proteinaceous emulsifying material—about 2.5 to about 7.0
   Protein micellar mass—about 1 to about 4.0
   Egg white—about to about 2.5
   gelatin—about 0.1 to about 1.0
Protein fibres—about 15 to about 45.

2. The process of claim 1 wherein said lipid material, water, proteinaceous emulsifying materials, and protein fibres are used in the following percentages by weight:

Lipid Material—about 70 to about 75
Water—about 18 to about 23
Proteinaceous emulsifying material—about 3.0 to about 5.0
   Protein micellar mass—about 1.5 to about 2.5
   Egg white—about 1 to about 1.75
   Gelatin—about 0.3 to about 0.5
Protein fibres—about 15 to about 20.

3. The process of claim 1 wherein said protein fibres are derived by coagulation of at least one wet protein micellar mass in fibrous form.

4. The process of claim 3 wherein said fibres have a length of about 0.5 to about 2 cm and a thickness from about 0.1 to about 1 mm.

5. The process of claim 1 wherein said emulsification is effected at a pH of about 6.5 to about 8.0, a sodium chloride concentration of up to about 3.5% by weight in the aqueous phase and at a temperature of up to about 40° C.

6. The process of claim 5 wherein said pH is about 7.0 to about 7.6 and said sodium chloride concentration is about 1 to about 2.5% by weight.

7. The process of claim 1, 2 or 5 wherein said heat coagulation is effected at a temperature of about 90° C. to about 120° C.

8. The process of claim 1, 2 or 5 wherein said protein micellar mass is formed by:

(a) extracting protein from proteinaceous material with an aqueous food grade salt solution at a temperature of about 15° to about 35° C., a salt concentration of at least 0.2 ionic strength and a pH of about 5.5 to about 6.5, and (b) decreasing the ionic strength of the protein solution to a value less than about 0.1 to precipitate and settle said protein micellar mass.

9. The method of claim 8 wherein said food grade salt solution has an ionic strength of about 0.2 to about 0.8 and said extraction is effected for about 10 to about 60 minutes.

10. The method of claim 8 wherein said protein is selected from the group consisting of plant proteins, animal proteins and microbial proteins.

11. The method of claim 8 wherein said proteins are selected from the group consisting of starchy cereals, starchy legumes and oil seeds.

12. A simulated adipose tissue comprising a heat coagulated matrix of protein with entrapped lipid material and protein fibres dispersed therethrough, produced by the process of claim 1.

13. A simulated adipose tissue comprising a heat coagulated matrix of protein with entrapped lipid material and protein fibres dispersed therethrough, produced by the process of claim 2.

14. The product of claim 12, wherein said edible lipid material includes an unsaturated vegetable oil.

15. The product of claim 14 wherein said protein fibres are formed by heat coagulation of at least one wet protein micellar mass in fibrous form.

* * * * *